United States Patent [19]

Kenny

[11] 4,184,480

[45] Jan. 22, 1980

[54] VACUUM WINDOW FOR SOLAR TRANSMISSION

[75] Inventor: Neal S. Kenny, Elmira, N.Y.

[73] Assignee: Corning Glass Works, Corning, N.Y.

[21] Appl. No.: 894,519

[22] Filed: Apr. 10, 1978

[51] Int. Cl.² ............................ F24J 3/02; E04B 7/18
[52] U.S. Cl. ..................................... 126/450; 52/200;
                                    52/796; 52/630; 52/788
[58] Field of Search .............. 126/270, 271; 237/1 A;
                               52/788, 200, 630, 796; 165/170, 171

[56] References Cited

U.S. PATENT DOCUMENTS

| 1,124,778 | 1/1915 | Meuler | 126/270 |
| 1,801,710 | 4/1931 | Abbot | 126/271 |
| 2,316,993 | 4/1943 | Sherwood | 52/796 |

FOREIGN PATENT DOCUMENTS

| 1509088 | 5/1969 | Fed. Rep. of Germany | 52/200 |
| 431002 | 8/1967 | Switzerland | 52/200 |

*Primary Examiner*—James C. Yeung

*Attorney, Agent, or Firm*—Burton R. Turner; John P. DeLuca

[57] ABSTRACT

A conventional flat plate solar heat collector is provided with a contoured vacuum insulation window supported solely about its peripheral edge portions. The window is a composite formed from a pair of minimum thickness complementarily contoured glass sheets, which with the exception of their peripheral portions which are sealed together, are spaced apart from one another so as to provide an evacuated chamber therebetween and thus insulate one sheet from the other. The window formed by the nested or complementary contoured glass sheets is contoured in both its longitudinal and lateral directions, such that in its longitudinal direction the window is composed of a plurality of sinusoidal corrugations whereas in its lateral direction the peaks of such corrugations are contoured in the form of paraboloids so as to provide maximum uniform tensile strength to the window such that it may withstand the forces generated thereon by the atmosphere.

2 Claims, 6 Drawing Figures

VACUUM WINDOW FOR SOLAR TRANSMISSION

BACKGROUND OF THE INVENTION

The efficiency of a solar heat collector is affected by the amount of convenction, conduction and radiation losses associated with its construction. It has been found that heat losses due to convection and conduction may be materially reduced by evacuating the air space within the solar collector about the absorber or collector plate. However, in the case of standard flat plates solar heat collectors having standard sized flat plate absorbers, it has not been possible to evacuate such collectors and provide a single solar window over the same which is supported solely about edge portions thereof, due to the atmospheric load which is exerted thereon upon evacuation of the collector. That is, with a standard atmospheric pressure of about 15 lbs./sq. in., an evacuated relatively shallow solar collector structure will have an atmospheric pressure of approximately one ton per square foot on the collector window.

Realizing that it was impossible to subject the standard flat window of a flat plate heat collector to such forces without catastrophic failure, the prior art devices such as shown in U.S. Pat. Nos. 3,929,122 and 3,974,823 utilized two solar windows spaced apart from one another to form a dead air space between the ambient atmosphere and the interior of the solar collector containing the absorber plate. Although the dead air space provided a degree of insulation, convection and conduction heat losses of significant magnitude were still experienced.

In order to provide the desired vacuum within the solar collector so as to minimize such convection and conduction heat losses from the absorber plate through the collector window to the ambient atmosphere, tubular solar collectors were utilized as shown in U.S. Pat. No. 3,227,153. The use of the tubular construction, which is strong in compression, permitted the evacuation of the solar collector and thereby materially reduced convection and conduction heat losses. However, the diameter of the solar collector was of course limited to practical aspects which accordingly limited the area of the flat plate collector or absorber member retained therein. Thus, in order to obtain the same surface area as was obtainable with a standard flat plate collector of a relatively large shallow structure, it was necessary to provide a multiplicity of such tubular collectors.

Other attempts have been made in supporting expansive flat solar windows in evacuated flat plate collectors, such as utilizing support posts as shown in U.S. Pat. No. 3,995,615 and longitudinally extending partition walls as shown in U.S. Pat. No. 4,038,965. Although the support posts of the former patent permit the utilization of a standard flat plate collector, each of the support posts in fact functions as a conductor to conduct heat to the window and thus to the ambient atmosphere. In the case of the latter patent, the plurality of longitudinal partitions necessitate the utilization of a plurality of small collector plates simliar to that used in the evacuated tubular collector, and again such partitions function as conductors or heat sinks to the solar window with the resultant loss of efficiency.

U.S. Pat. No. 3,986,491 discloses the use of a sheet of transparent or translucent corrugated plastic positioned above and across a metallic heat collecting surface having hills and valleys, with the corrugation as far as possible focusing the rays of the sun on one side of the flaring hills in the morning and focusing the solar rays on the opposite side of the hills during the afternoon. Further, U.S. Pat. No. 3,987,783 discloses the use of a pair of domed clear flexible plastic sheets to provide a cover for a solar collector with a dead air space for additional insulation from the atmosphere. However, in both patents the solar collectors are not evacuated, as air spaces are provided within the collectors and between the clear plastic solar windows.

An application filed on even date by F. T. Coppola, W. P. Lentz and R. V. VanDewoestine, Ser. No. 894,899, entitled Contoured Window for Evacuated Solar Collector and assigned to the applicants' assignee, discloses a contoured window for use with evacuated solar collectors wherein the window is sealed to a lower housing portion and the cavity formed thereby evacuated with the window contoured to withstand the atmospheric pressure exerted thereon. The present invention sets forth an improvement utilizing such contoured glass sheet and provides an evacuated window thus eliminating the necessity of evacuating the entire solar collector chamber and the need for providing a strengthened lower housing to withstand such evacuation. Further, with the interior of the present collector at atmospheric pressure, there is no need to provide elaborate seals between the upper and lower portions of the housing.

Accordingly, the present invention sets forth a vacuum window which not only functions as a peripherally supported transparent cover for skylights, conventional flat plate solar collectors and the like, but also the evacuated chamber within the window provides insulation and materially limits thermal losses through the window to provide such devices with increased efficiencies.

SUMMARY OF THE INVENTION

In its simplest form, the present invention is directed to a contoured vacuum insulation solar window and a flat plate solar collector utilizing such window. The solar window is formed from a pair of complementarily contoured glass plates which are spaced apart from one another with the exception of the peripheral portions which are sealed together. In order to increase thermal efficiencies within a solar collector utilizing such window, the chamber between the complementary contoured sheets is partially evacuated and the window is supported solely about its peripheral portions, thereby reducing thermal conductance from the collector through the window. Further, in order to withstand the pressures exerted thereon by the atmosphere and be of minimum glass thickness for reduced weight, the window should be made of a glass having a minimum MOR of about 10,000 psi and should be sinusoidally corrugated along its longitudinal extent and, in order to obtain maximum uniform tensile strength, the upwardly extending corrugations should each be contoured laterally of the window in the form of a paraboloid as disclosed in said aforementioned Coppola et al. application. Thus, it is possible to form a continuous evacuated window for a standard flat plate solar collector, which window is of minimum glass thickness and weight, but yet will withstand the forces of atmospheric pressure being exerted thereon.

It thus has been an object of the present invention to provide a new solar window stucture for conventional flat plate solar collectors which window is formed from a pair of spaced apart complementarily contoured glass sheets having a partial vacuum formed therebetween wherein the sheets are complementarily contoured with a sinusoidal curvature in their longitudinal direction and with a parabolic curvature in their lateral or transverse direction thus providing a peripherally supported vacuum insulation window of minimum glass thickness which will withstand atmospheric pressure exerted thereon.

DESCRIPTION OF THE PREFERRED EMBODIMENTS

Figure 1:
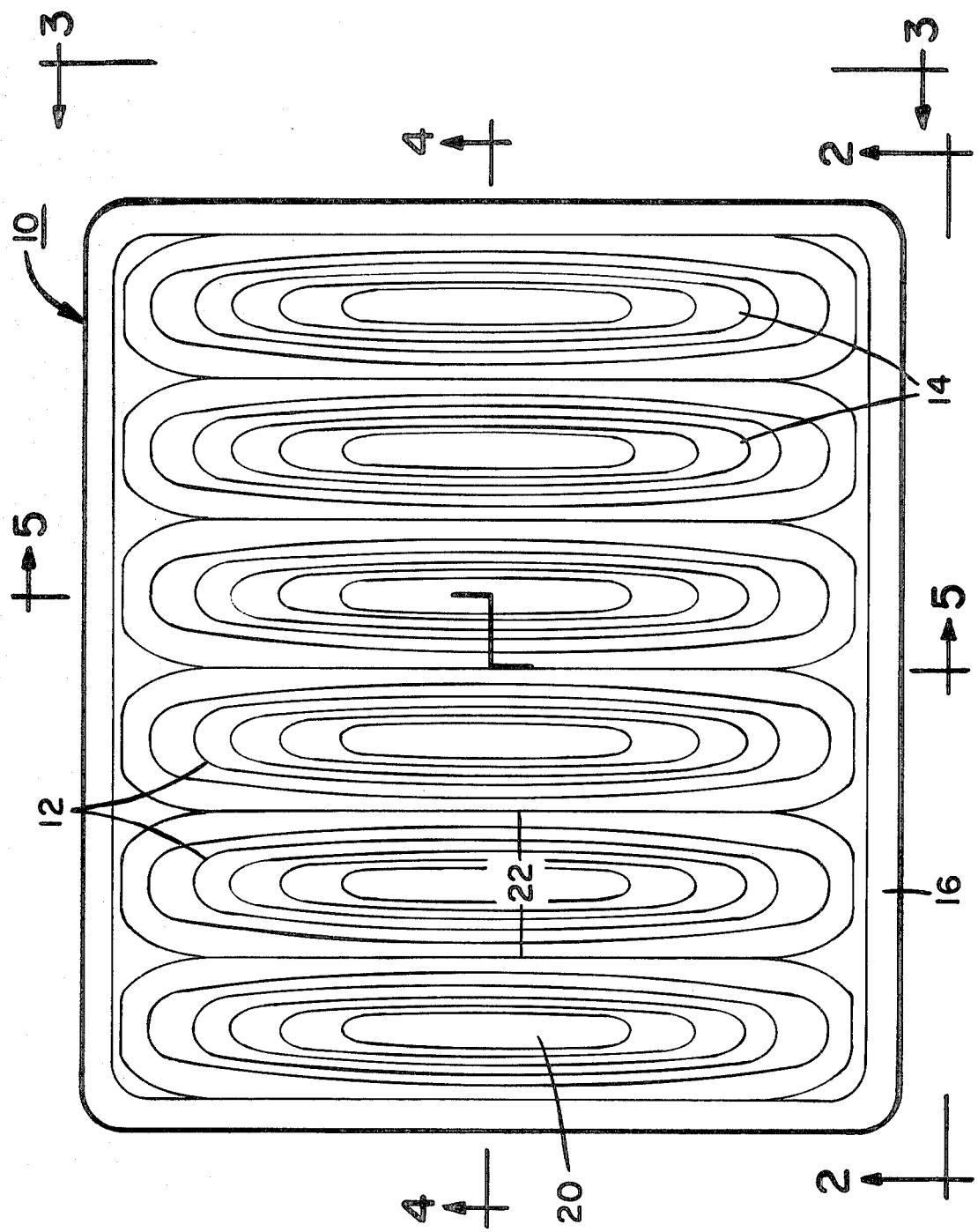
FIG. 1 is a somewhat schematic contour line drawing of the top plan view of a solar window embodying the present invention.
Figure 2:
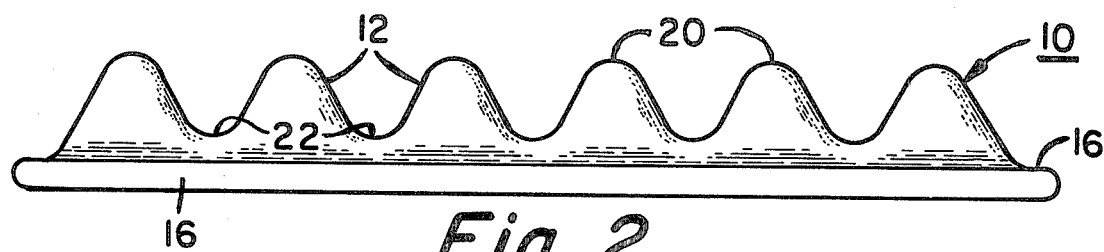
FIG. 2 is a longitudinal elevational view of the window taken along line 2—2 of FIG. 1.
Figure 3:
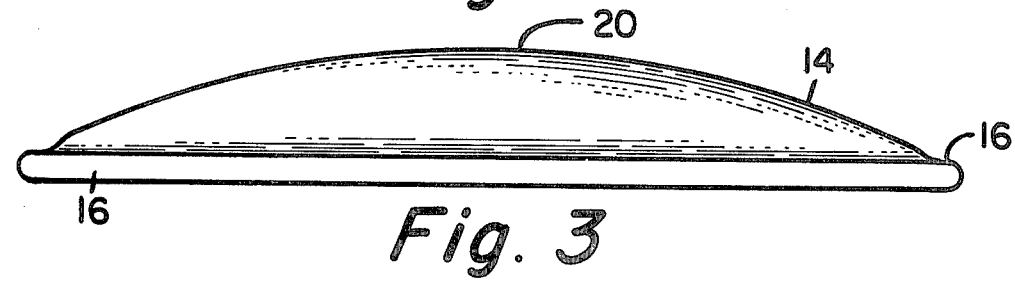
FIG. 3 is a lateral elevational view of the window taken along line 3—3 of FIG. 1.
Figure 4:
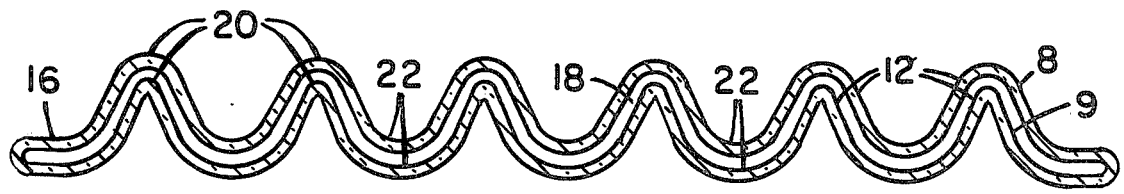
FIG. 4 is a longitudinal cross sectional view in elevation taken along line 4—4 of FIG. 1.

Referring now to the drawings, and particularly FIGS. 1-5, a pair of complementarily contoured glass sheets 8 and 9 are shown forming a contoured vacuum solar window 10 having a plurality of corrugations 12 extending longitudinally thereof which are contoured laterally in the shape of paraboloids 14. Each of the glass sheets 8 and 9 are bounded by a peripheral sealing edge or flange portion 16 which seals the complementarily contoured glass sheets together in spaced apart relationship so as to form an evacuated chamber 18 therebetween. The corrugations 12 of the outer complementary contoured glass sheet 8 and inner complementary contoured glass sheet 9 terminate at their upper extent in peaks 20 and at their lower extent in valleys 22.

Figure 6:
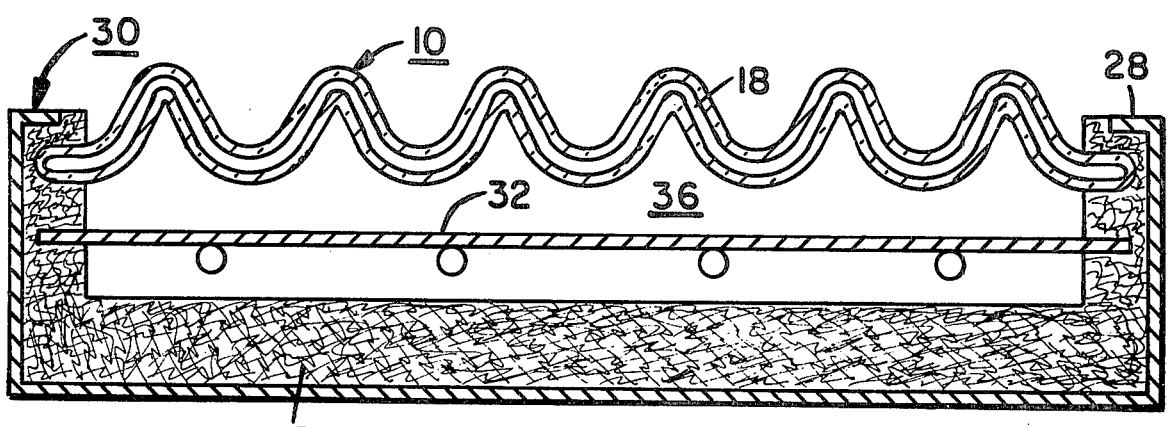
FIG. 6 is a longitudinal cross sectional view in elevation of a standard flat plate solar collector utilizing the improved vacuum solar window of the present invention.

Referring now to FIG. 6, a conventional flat plate solar collector 30 is shown having a housing or frame 28 provided with a contoured vacuum window 10 of the present invention. In order to reduce thermal losses, the housing or frame 28 may be provided about its interior extent with suitable insulation 38, and a collector plate or absorber 32 having a plurality of fluid channels 34 secured to an under surface thereof is shown positioned within the air space 36 formed between said solar window 10 and the housing 28. In view of the fact that the interior chamber or air space 36 of the collector 30 is at atmospheric pressure, there is no need to provide complex vacuum seals between the window 10 and the housing 28 or to substantially strengthen the housing 28 to withstand atmospheric pressures.

Figure 5:
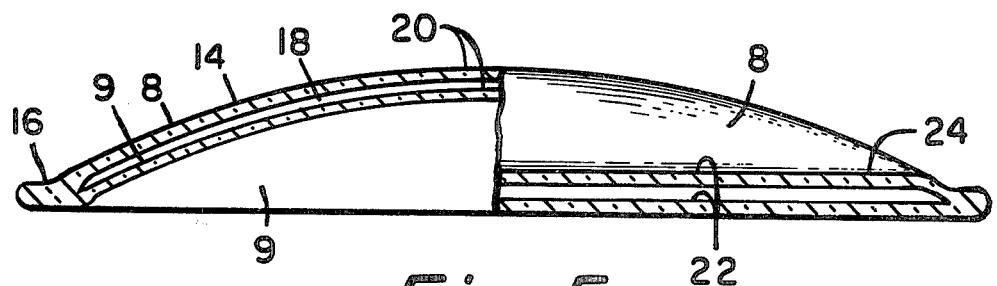
FIG. 5 is a lateral cross sectional view in elevation taken along line 5—5 of FIG. 1.

As will be noted from FIG. 6, the contoured solar window 10 is supported solely at its peripheral sealing edge or flange portions 16 and is otherwise unsupported and spaced apart from the collector plate 32. The longitudinally space sinusoidal corrugations 12 are laterally contoured in the shape of paraboloids which provide a plurality of longitudinally spaced-apart substantially constant stress beams extending laterally across the window 10 to form a duplex vacuum solar window of minimum thickness strengthened glass material which can withstand the atmospheric forces exerted solely on the exterior thereof due to the evacuated chamber 18 formed interiorly of the peripherally sealed complementarily contoured glass sheets 8 and 9. The cross section of each paraboloid 14 as shown in FIG. 5 is in the form of a parabola, so that the plurality of paraboloids, joined together along adjacent base portions 22, provide maximum uniform tensile strength along their extent so as to minimize the bending moment imparted thereto by the atmosphere and thus maximize the overall strength for a given minimum thickness of strengthened glass.

It can be appreciated that since the window of the present invention is provided with a partially evacuated chamber 18 therewithin, that the window is in fact an insulation window since conduction and convection heat losses from the interior air space 36 of the collector 30 are substantially reduced. Further, in view of the fact that the housing 18 and the mounting of the window 10 are provided with insulation material, conduction heat losses through such portions of the collector are also minimized, thereby providing a collector with increased thermal efficiencies.

Although the preferred embodiments of the present invention have been set forth, it will be apparent to those skilled in the art that various changes and modifications may be made thereto without departing from the spirit and scope of the invention as defined in the appended claims.

I claim:

1. A flat plate solar collector comprising, housing means, a composite evacuated contoured solar window overlying said housing means and providing an air space cavity therebetween, said composite evacuated contoured solar window being supported by said housing means solely about peripheral portions of said window, insulation means within said housing means, flat plate collector means positioned within said cavity and having fluid channel means associated therewith for removing heat therefrom, said composite evacuated contoured solor window including a pair of complementarily contoured glass sheets each having a longitudinal extent and a lateral extent, such sheets being sealed together about peripheral portions thereof, a partially evacuated chamber formed between said complementarily contoured glass sheets, each of said sheets having complementary corrugations extending longitudinally therealong, said corrugations being curved laterally across the extent of said sheets to provide constant stress beams so as to withstand atmospheric pressure exerted thereon while the evacuated chamber therebetween substantially reduces conduction and convection heat losses through said window to provide said collector with improved thermal efficiencies, and said plurality of laterally extending constant stress beams extending from said peripheral portion at opposed ends thereof in the form of a plurality of complementarily spaced apart paraboloidal beams positioned longitudinally along and extending laterally across said solar window between said peripheral portions thereof.

2. A composite evacuated contoured insulation window for use with a closed chamber comprising, a pair of complementarily contoured glass sheets each having a longitudinal extent and a lateral extent, said sheets each having peripheral sealing portions, said sealing portions being joined together about their peripheral extent with remaining portions of said complementarily contoured glass sheets being spaced apart and forming a partially evacuated chamber therebetween, each of said complementarily contoured glass sheets having a plurality of corrugations extending longitudinally therealong with the corrugation of one sheet being complemental with and spaced apart from those of the other sheet, said plurality of contoured corrugations providing a plurality of substantially constant stress beams spaced apart along the longitudinal extent of said window and extending laterally thereof, and said plurality of constant stress beams being contoured laterally of each sheet from peripheral sealing portions adjacent opposed ends thereof to form a plurality of paraboloidal shaped beams spaced apart along the longitudinal extent thereof.

* * * * *